(12) United States Patent
Nagura et al.

(10) Patent No.: US 7,490,907 B2
(45) Date of Patent: Feb. 17, 2009

(54) SEAT FOR VEHICLE

(75) Inventors: Mikihito Nagura, Okazaki (JP); Takayuki Ogasawara, Kakamigahara (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 11/496,426

(22) Filed: Aug. 1, 2006

(65) Prior Publication Data

US 2007/0040437 A1  Feb. 22, 2007

(30) Foreign Application Priority Data

Aug. 5, 2005 (JP) .............................. 2005-227644

(51) Int. Cl.
*B60N 2/235* (2006.01)

(52) U.S. Cl. .................................. 297/367; 297/378.12

(58) Field of Classification Search ............... 267/367, 267/378.12

See application file for complete search history.

(56) References Cited

U.S. PATENT DOCUMENTS

| | | | | |
|---|---|---|---|---|
| 5,216,936 | A * | 6/1993 | Baloche .................. | 297/367 X |
| 5,590,931 | A * | 1/1997 | Fourrey et al. ............... | 297/366 |
| 5,611,599 | A * | 3/1997 | Baloche et al. .............. | 297/367 |
| 5,769,494 | A * | 6/1998 | Barrere et al. ............... | 297/367 |
| 5,857,746 | A * | 1/1999 | Barrere et al. ............... | 297/367 |
| 6,007,153 | A * | 12/1999 | Benoit et al. ........... | 297/378.12 |
| 6,082,821 | A * | 7/2000 | Baloche et al. ..... | 297/378.12 X |
| 6,085,386 | A * | 7/2000 | Blanchard et al. ....... | 297/367 X |
| 6,095,608 | A * | 8/2000 | Ganot et al. ................ | 297/367 |
| 6,112,370 | A * | 9/2000 | Blanchard et al. ... | 297/378.12 X |
| 6,454,354 | B1 * | 9/2002 | Vossmann et al. ........... | 297/367 |
| 6,554,361 | B2 * | 4/2003 | Reubeuze et al. ........... | 297/367 |
| 6,619,744 | B2 * | 9/2003 | Reubeuze .............. | 297/378.12 |
| 6,739,668 | B2 * | 5/2004 | Coman et al. .......... | 297/378.12 |
| 7,014,265 | B2 * | 3/2006 | Yamada et al. ............... | 297/367 |
| 7,055,906 | B2 * | 6/2006 | Shinozaki .................... | 297/367 |
| 7,159,945 | B2 * | 1/2007 | Eppert ........................ | 297/367 |
| 7,255,398 | B2 * | 8/2007 | Tokui et al. ................. | 297/367 |
| 7,328,954 | B2 * | 2/2008 | Sasaki et al. ........... | 297/378.12 |
| 7,364,237 | B2 * | 4/2008 | Grable et al. ............ | 297/367 X |
| 7,380,885 | B2 * | 6/2008 | Fischer et al. .......... | 297/378.12 |
| 7,387,340 | B2 * | 6/2008 | Wilkening ............. | 297/378.12 |
| 7,393,056 | B2 * | 7/2008 | O'Connor ............. | 297/378.12 |
| 2003/0080600 | A1 * | 5/2003 | Eppert ........................ | 297/367 |
| 2004/0262969 | A1 | 12/2004 | Sasaki et al. | |
| 2006/0012232 | A1 * | 1/2006 | Coughlin et al. ............ | 297/367 |

FOREIGN PATENT DOCUMENTS

JP       2004-330991 A    11/2004

* cited by examiner

*Primary Examiner*—Rodney B. White
(74) *Attorney, Agent, or Firm*—Buchanan Ingersoll & Rooney PC

(57) ABSTRACT

Right and left side reclining apparatuses adjust a rotational position of a seat back frame relative to a seat cushion frame of a seat for a vehicle. Each of the reclining apparatuses includes an upper arm which rotates with the seat back frame, a lower arm to which the upper arm is rotatably attached, and a lock member for locking rotation of the upper arm relative to the lower arm or releasing the lock. At least one of the reclining apparatuses includes a rotating member for forward-tilting which enables the seat back frame to rotate relative to the seat cushion frame while the lock is exerted, and an engaging member for locking rotation of the rotating member for forward-tilting. The right and left side reclining apparatuses are connected by a connecting member.

15 Claims, 7 Drawing Sheets

Rear ⟷ Front

SEAT FOR VEHICLE

CROSS REFERENCE TO RELATED APPLICATIONS

This application is based on and claims priority under 35 U.S.C. § 119 to Japanese Patent Application 2005-227644, filed on Aug. 5, 2005, the entire content of which is incorporated herein by reference.

FIELD OF THE INVENTION

This invention generally relates to a seat for a vehicle. More specifically, this invention pertains to a seat for a vehicle including a reclining apparatus.

BACKGROUND

Conventionally, a seat for a vehicle including a reclining apparatus is configured by right and left cushion frames for supporting a seat cushion, right and left seatback frames which support a seat back and which are rotatable relatively to the cushion frames, and a reclining apparatus interposed between each of the cushion frames and each of the seat back frames for adjusting a rotational position of the seat back frames (refer to patent document JP2004-330991A).

The reclining apparatus described in the patent document includes a lower arm fixed to a cushion frame, an upper arm which is rotatably attached to the lower arm and which is rotatable with a seat back frame, the lower arm to which the upper arm is rotatably attached, and a lock member. The lock member is operated to switch, at the time when the rotational position of the seat back frame is adjusted within a range of seating positions, between a locked state, in which rotation of the upper arm is locked, and a lock-released state, in which the lock of the rotation of the upper arm is released.

Then, the reclining apparatus includes a ratchet (a rotating member for forward-tilting) interposed between the upper arm and the seat back frame in order for operating the seat back to tilt forward (walk-in operation) in a state where a position of a reclining angle adjustment is memorized, at the time when an occupant enters or exits from a seat which is positioned at the back of the seat back. The ratchet is fixed to the upper arm, and is rotatably attached to the seat back frame. Accordingly, in a situation where an engagement of the latchet is released, the locked state is retained, and the seat back frame is rotated relatively to the latchet, the walk-in operation can be performed while the position of reclining angle adjustment is memorized.

However, in the configuration described in the patent document, in a situation where erroneous operations, such that the lock of the lock member is released at the time of the walk-in operation, is performed, the upper arm becomes freely rotatable with the ratchet out of relation to the rotational position of the seat back frame. By this, there is a danger that the walk-in operation is terminated by engaging the ratchet in a state where phases of rotational angles of the upper arm relative to the lower arm between a right side reclining apparatus and a left side reclining apparatus displace. Then, in a situation where next reclining operation of the seat back is performed in a state where the phase displaces as described above, operation's feeling is unpleasant.

Further, in the configuration described in the patent document, the ratchet is interposed between the upper arm and the seat back frame. However, in a configuration in which the ratchet is interposed between the lower arm and the cushion frame, similarly, the phase displacement described above induces an unpleasant feeling of the reclining operation. A need thus exists for a seat for a vehicle, in which walk-in operation is possible while a position of a reclining angle adjustment is memorized, and in which degradation of feeling of a reclining operation of a seat back can be inhibited. The present invention has been made in view of the above circumstances and provides such a seat for a vehicle.

SUMMARY OF THE INVENTION

According to an aspect of the present invention, a seat for a vehicle includes a cushion frame provided at each of a left side and a right side of a seat cushion for supporting the seat cushion, a seat back frame provided at each of a left side and a right side of a seat back for supporting the seat back, the seat back frame rotatable to the cushion frame, a right side reclining apparatus provided between the cushion frame of the right side of the seat cushion and the seat back frame of the right side of the seat back for adjusting a rotational position of the seat back frame, and a left side reclining apparatus provided between the cushion frame of the left side of the seat cushion and the seat back frame of the left side of the seat back for adjusting the rotational position of the seat back frame. Each of the right side reclining apparatus and the left side reclining apparatus includes an upper arm rotatable with the seat back frame, a lower arm to which the upper arm is rotatably attached, and a lock member for switching between a locked state, in which rotation of the upper arm relative to the lower arm is locked, and a lock-released state, in which a lock of the rotation of the upper arm relative to the lower arm is released, in a situation where the rotational position of the seat back frame is to be adjusted within a range of seating positions. At least one of the right side reclining apparatus and the left side reclining apparatus includes a rotating member for forward-tilting attached to either one of the upper arm and the lower arm so that the rotating member for forward-tilting cannot rotate relative to either one of the upper arm and the lower arm, the rotating member for forward-tilting enabling the seat back frame to rotate relative to the cushion frame while the locked state is retained, and an engaging member which engages with/disengages from an engaging portion formed at the rotating member for forward-tilting for locking rotation of the rotating member for forward-tilting by engaging with the engaging portion. The seat for the vehicle further includes a connecting member for connecting the right side reclining apparatus and the left side reclining apparatus so that a rotational angle of the upper arm relative to the lower arm of the right side reclining apparatus is synchronized with a rotational angle of the upper arm relative to the lower arm of the left side reclining apparatus.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be explained with reference to drawing figures. In the meantime, arrows which indicate up, down, front, rear, right, and left directions in the figures indicate directions of a seat 100 for a vehicle 200 relative to the vehicle 200 in a state where the seat 100 for the vehicle 200 is equipped in the vehicle 200.

Figure 1:
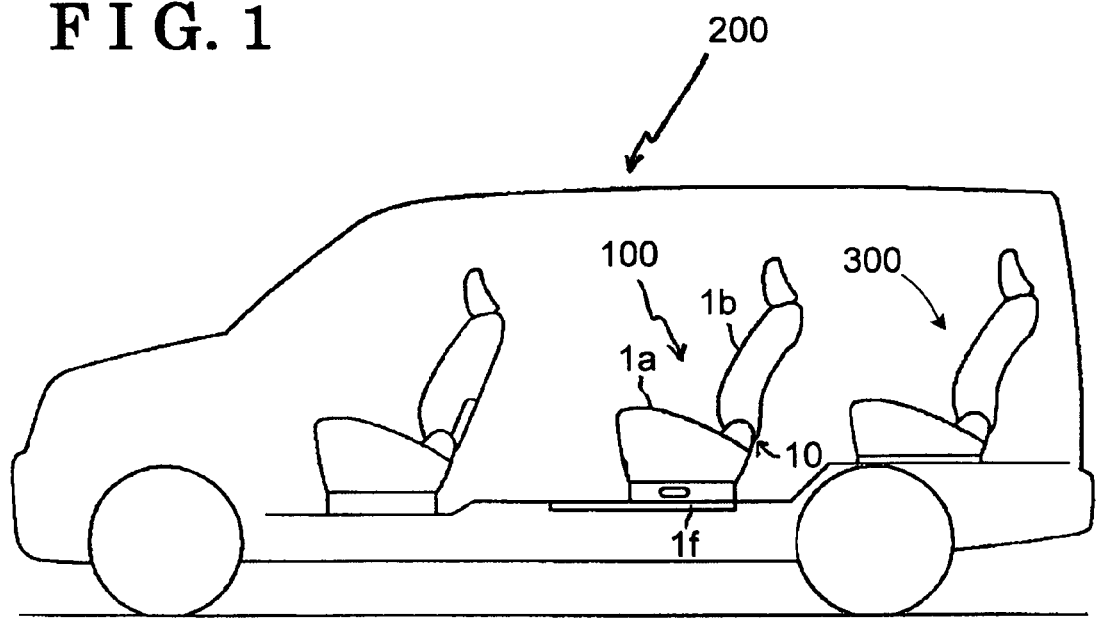
FIG. 1 represents a side view illustrating a seat 100 for a vehicle 200 provided in the vehicle 200 according to an embodiment of the present invention.
Figure 2:
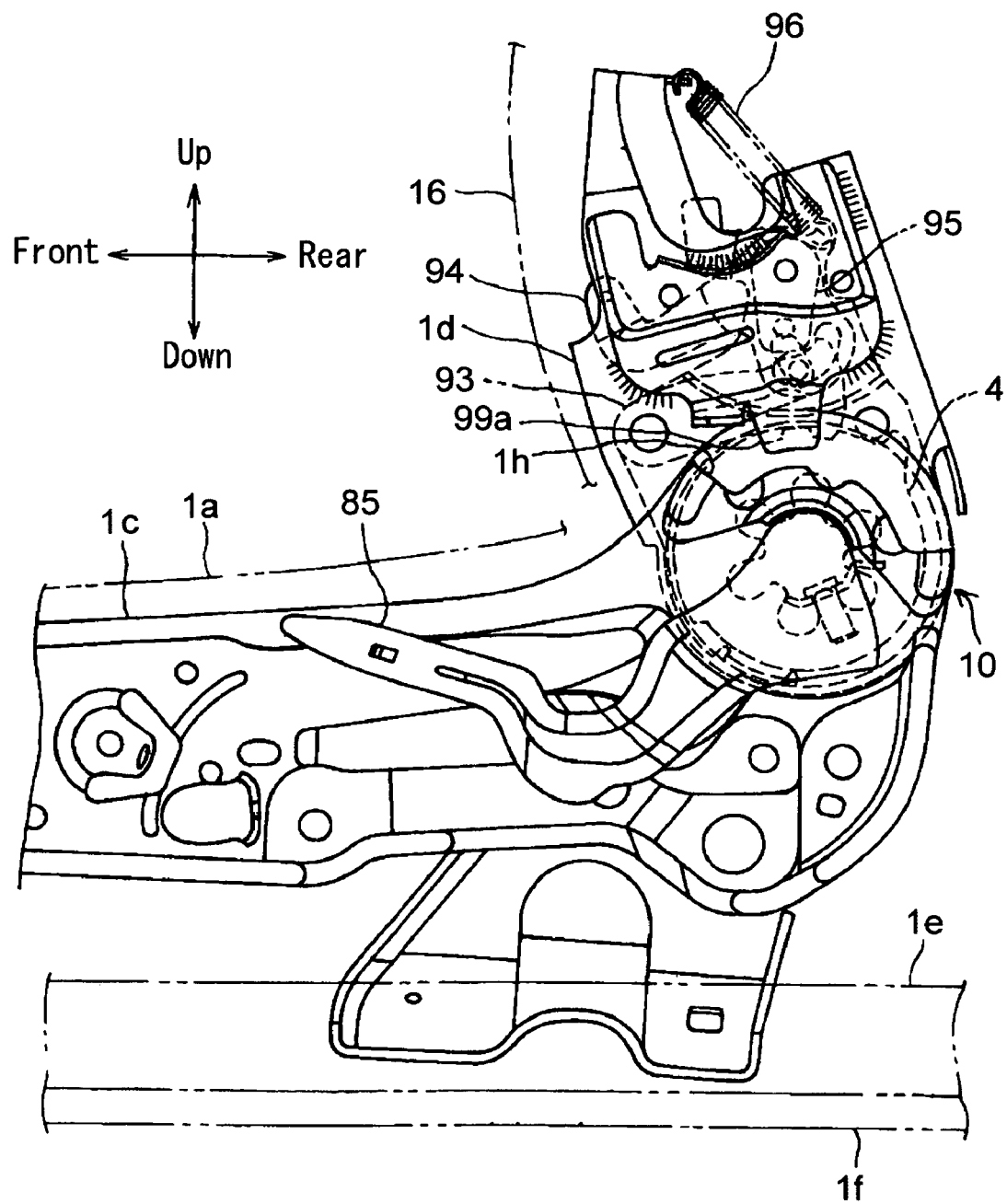
FIG. 2 represents a side view illustrating the seat 100 for the vehicle 200 according to the embodiment of the present invention.

As illustrated in FIGS. 1 and 2, the seat 100 for the vehicle 200 according to the embodiment includes a seat cushion 1a and a seat back 1b, which are made of urethane foam, or the like, a cushion frame 1c and a seat back frame 1d, which are made by press molding, and a reclining apparatus 10.

The cushion frame 1c extends in a fore-aft direction of the vehicle 200. The cushion frame 1c is provided at each of a right side and a left side of the seat cushion 1a for supporting the seat cushion 1. Further, an upper rail 1e is connected to the cushion frame 1c. The upper rail 1e is slidably attached to a lower rail if fixed on a floor of the vehicle 200. Further, the right side and the left side cushion frames 1c are connected through a rod (not illustrated), which extends in a right and left direction.

The seat back frame 1d is provided at each of a right side and a left side of the seat back 1b. The seat back frame 1d extends in an upper and lower direction in a seating state. The seat back frame 1d supports the seat back 1b. Further, the right side and the left side seat back frames 1d are connected through a rod (not illustrated), which extends in a right and left direction. Then, an end portion of the seat back frame 1d is positioned at the inside of an end portion of the cushion frame 1c. The end portions of the seat back frame 1d and of the cushion frame 1c are connected by the reclining apparatus 10. Further, the seat back frame 1d is biased by elastic force of a spring 1g illustrated in FIG. 4 in a direction in which the seat back 1b reclines forward.

Figure 3:
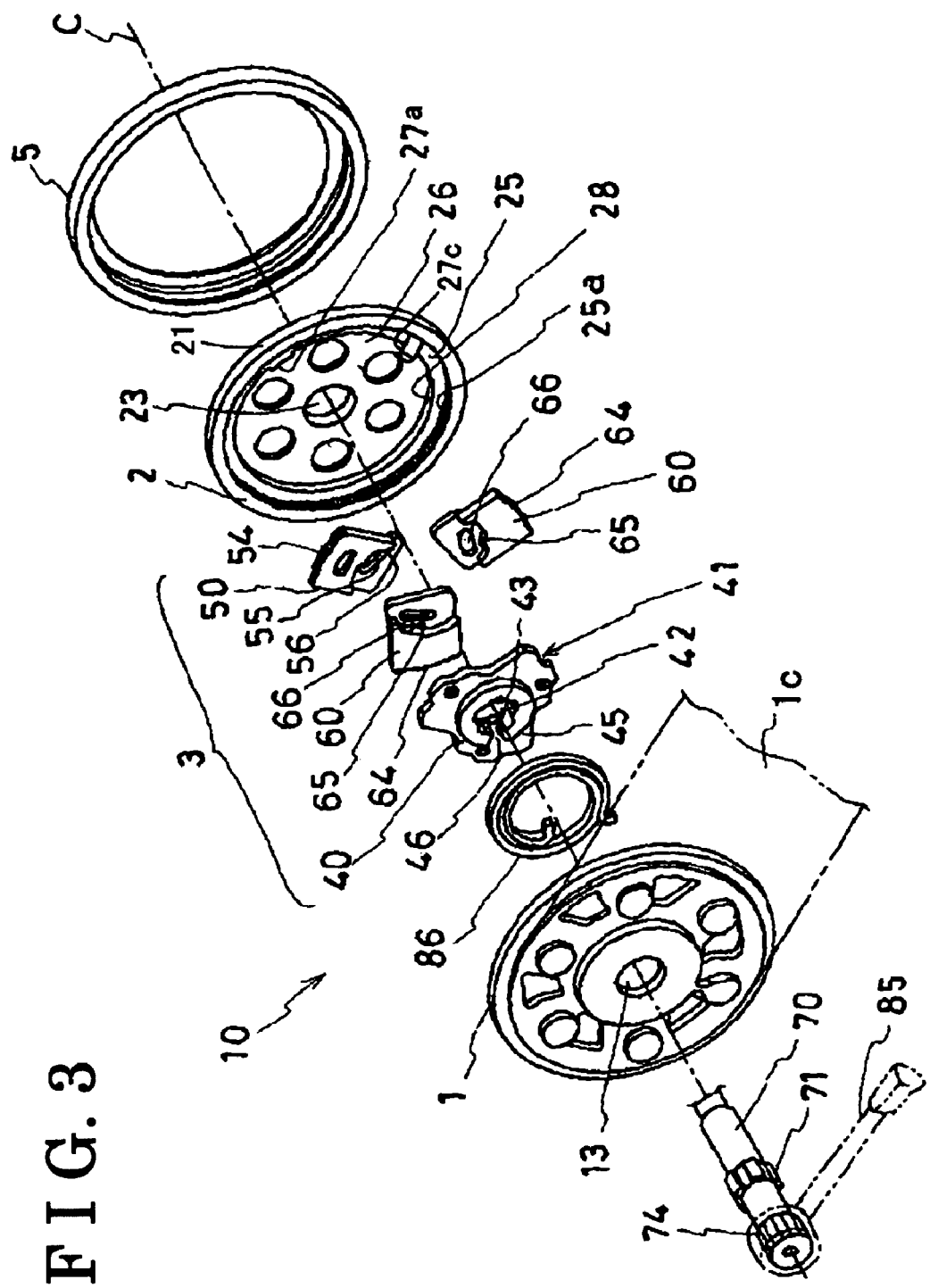
FIG. 3 represents an exploded perspective view mainly illustrating a part including a lower arm 1 and an upper arm 2 in a reclining apparatus 10.
Figure 4:
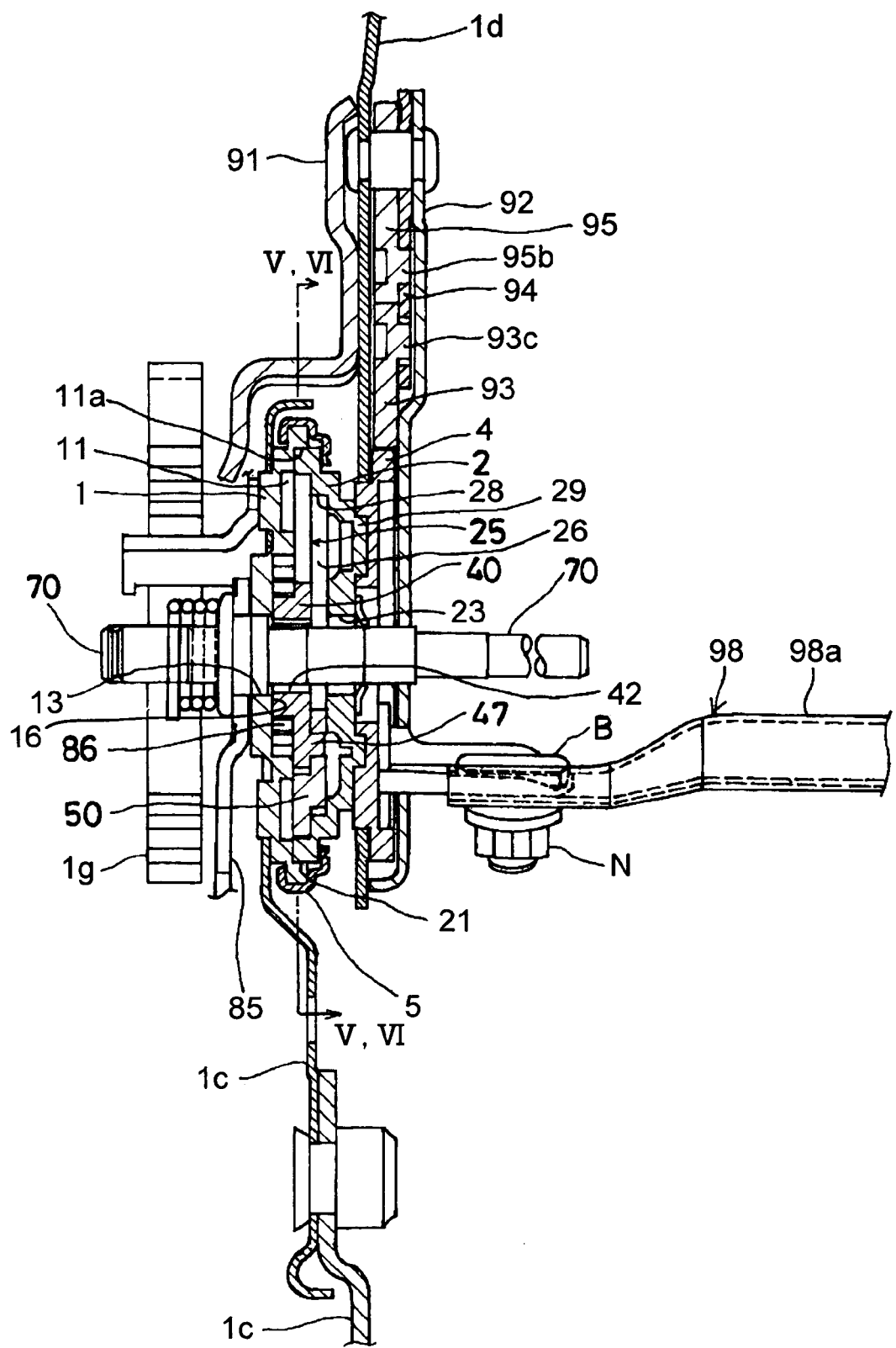
FIG. 4 represents a cross-sectional view illustrating a center part of the seat 100 for the vehicle 200 illustrated in FIG. 2.

As illustrated in FIGS. 3 and 4, each of the right side and the left side reclining apparatuses 10 includes a lower arm 1 and an upper arm 2, both have a disk outline, a lock mechanism 3 (lock member), and a ratchet 4 which serves as a rotating member for forward-tilting, or the like. The lower arm 1 is fixed to the cushion frame 1c by welding. The upper arm 2 is fixed to the ratchet 4 by welding. The ratchet 4 is rotatably attached to the seat back frame 1d.

The lower arm 1 includes a recessed portion 11, which opens to a direction of the upper arm 2. The recessed portion 11 is formed by half die cutting. Then, the recessed portion 11 includes an inner circumferential surface 11a of which a center is a rotational axis line C of the upper arm 2 and the lower arm 1. The upper arm 2 is located so that an outer circumferential surface 21 thereof slides along the inner circumferential surface 11a of the lower arm 1. Sliding surfaces of the lower arm 1 and the upper arm 2 function as an axis and a bearing for mutual rotation of the lower arm 1 and the upper arm 2.

Further, a holder 5, which is located so as to cover an outer periphery of the upper arm 2, supports the lower arm 1 in a manner that the holder 5 contacts a side surface of the lower arm 1. Thus, a state, in which the upper arm 2 and the lower arm 1 are rotatably assembled to each other, are retained. Further, the holder 5 is processed to bend at the last process of assembling the seat reclining apparatus 10 for supporting the lower arm 1 and the upper arm 2 assembled together.

A recessed portion 25 is formed at the upper arm 2 by half die cutting. The recessed portion 25 opens to the lower arm 1 side. Inner teeth 25a are formed over an entire circumference of an inner circumferential portion of the recessed portion 25, the inner circumferential portion of which a center is the rotational axis line C. A recessed portion 26 is formed at an inside of the recessed portion 25 by another half die cutting. Here, the recessed portion 26 is a circle coaxial with the recessed portion 25. Projections 27a and 27c, which project toward the rotational axis line C, are formed at a part of an inner circumferential portion 28 of the recessed portion 26.

Figure 7:
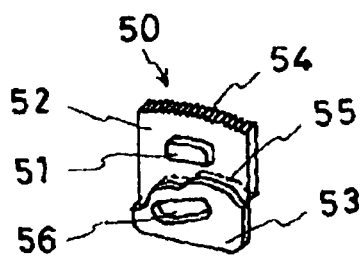
FIG. 7 represents a perspective view illustrating a first pawl 50 illustrated in FIGS. 5 and 6.
Figure 8:
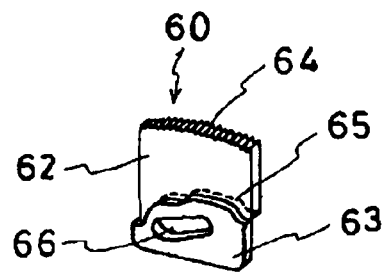
FIG. 8 represents a perspective view illustrating a second pawl 60 illustrated in FIGS. 5 and 6.

The lock mechanism 3 is provided between the lower arm 1 and the upper arm 2. The lock mechanism 3 includes two kinds of pawls 50 and 60 (three in total) located in a plane vertical to the rotational axis line C. The pawls 50 and 60 are located at equal angle intervals. As illustrated in FIGS. 7 and 8 in detail, one pawl 50 (a first pawl) includes a projection 51 on a side surface, and the other two pawls 60 (second pawls) have the same shape as the pawl 50, except that each of the pawls 60 exclude the projection 51.

As illustrated in FIGS. 7 and 8, the three pawls 50 and 60 are made of a steel plate. Two surface portions of first surface portions 52 and 62 and second surface portions 53 and 63 are respectively connected to each other with a step. Thus, each of the pawls 50 and 60 has an approximately rectangular shape. Outer teeth 54 and 64, which can engage with the inner teeth 25a of the upper arm 2, are formed at an edge surface of each first surface portion 52 and 62 of the pawls 50 and 60. Back cam surfaces 55 and 65 are formed at stepped portions of the first surface portions 52 and 62 and of the second surface portions 53 and 63 at edge surfaces respectively, which are opposite side of the outer teeth 54 and 64. Further, cam long holes 56 and 66 are formed so that the cam long holes 56 and 66 penetrate the second surface portions 53 and 63 in a plate-thickness direction. Both end portions, which sandwich the outer teeth 54 and 64 of the pawls 50 and 60 in a width direction, which is perpendicular to a plate thickness, are formed as parallel lines.

Figure 5:
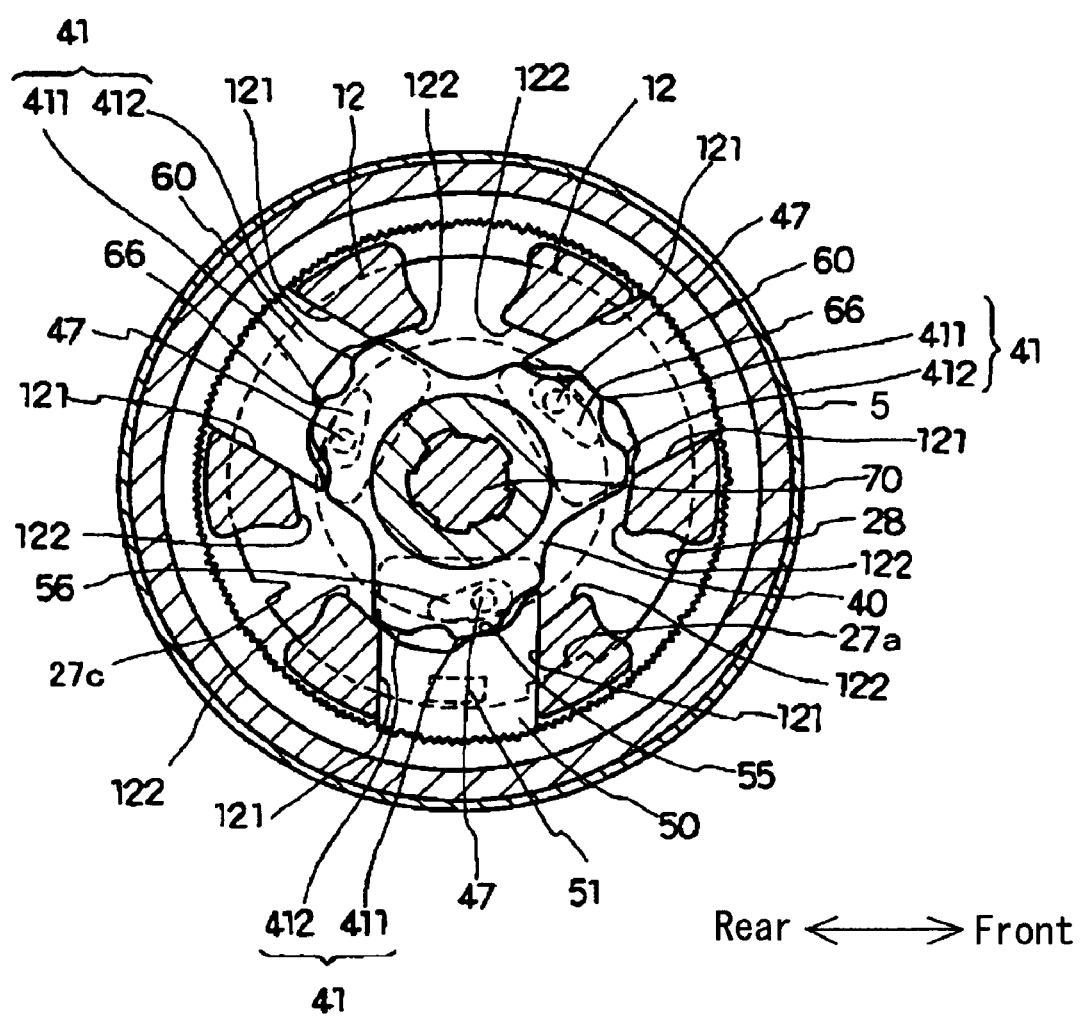
FIG. 5 represents a cross-sectional view taken on line V-V of FIG. 4, the cross-sectional view illustrating a locked state of pawls 50 and 60.

On the other hand, as illustrated in FIG. 5, six recessed portions 12 are provided in the recessed portion 11 of the lower arm 1. The six recessed portions 12 are formed by half die cutting so that the six recessed portions 12 open to an inverse direction of the recessed portion 11. Every two of the six recessed portions 12 makes a pair, therefore three pairs are formed. The pairs of the recessed portions 12 are located at equal intervals of each other around the rotational axis line C as a center. Distances of the pairs of the recessed portions 12 from the rotational axis line C are equal. Each of the recessed portions 12 includes a guiding wall 121 (sliding portion) and a cam-engaging portion 122 (engaging portion). Each of three pairs of the guiding walls 121 is provided in parallel to each other so that each of the three pairs of the guiding walls 121 can face each other. Further, a width of the facing guiding walls 121 is approximately the same as a width of the pawls 50 and 60. The pawls 50 and 60 are assembled with the guiding walls 121 so that the pawls 50 and 60 are fitted between the guiding walls 121. Each of the pawls 50 and 60 is guided by the guiding walls 121 and can slidably move in a direction that the pawls 50 and 60 come close to the rotational axis line C or in a direction that the pawls 50 and 60 depart from the rotational axis line C. The cam-engaging portion 122 will be described later. As described above, because the guiding walls 121 and the cam-engaging portions 122 are provided at the recessed portions 12 as a unit, the number of parts of the entire reclining apparatus can be reduced, and a configuration thereof can be compact.

The lock mechanism 3 further includes a cam 40. The cam 40 includes a cam surface 41. The cam surface 41 is rotatably located in the recessed portion 25 of the upper arm 2 on the rotational axis line C. Three cam surfaces 41 are formed at equal angle intervals. Further, a pawl-pressing portion 411 and an aligning portion 412 are formed at each of the cam surfaces 41. The pawl-pressing portion 411 can contact the back cam surfaces 55 and 65 (illustrated in FIGS. 7 and 8) of each of the pawls 50 and 60. Then, the outer teeth 54 and 64 of the pawls 50 and 60 can be pressed by rotation of the cam 40 so that the outer teeth 54 and 64 can engage with the inner teeth 25a. Further, the aligning portion 412 can engage with/disengage from the cam-engaging portion 122 of the recessed portion 12. In other words, three aligning portions 412 can engage with three cam-engaging portions 122 by the rotation of the cam 40 approximately at the same time. Further, protruding pins 47, which protrude so as to be inserted into the cam long holes 56 and 66 of the pawls 50 and 60, are formed on a side surface of the cam 40, the surface which is closer to the rotational axis line C than each of cam surfaces 41 is.

A hinge axis 70 is located on the rotational axis line C. The hinge axis 70 is inserted into each penetrating hole 13, 42, 23, and 4a of the lower arm 1, the cam 40, the upper arm 2, and the ratchet 4, and rotatably supported. Splines 71, which include plural splines which open in a diametrical direction and which extend in an axial direction, are formed on an outer circumferential surface of an approximate center portion of the hinge axis 70 in an axial direction. On the other hand, female splines 43, which engage with the splines 71 of the hinge axis 70, are formed at the penetrating hole 42 of the cam 40. Therefore, the hinge axis 70 and the cam 40 are configured to rotate as a unit. Here, the splines 43 of the cam 40 are formed to be slightly larger than the splines 71 of the hinge axis 70. In other words, the cam 40 has some degree of play relative to the hinge axis 70 in a diametrical direction. Accordingly, the cam 40 can move in the recessed portion 25 of the upper arm 2 relative to the hinge axis 70 toward a direction of the pressing portion 411.

Further, a serration 74, which has plural tooth grooves which extend in an axial direction, is formed at an outer peripheral surface of one end of the hinge axis 70. An operation handle 85 for reclining, which includes a serration, which engages with the serration 74, is attached to the hinge axis 70 as a unit. In the meantime, the operation handle 85 is attached to only one reclining apparatus 10 of right and left reclining apparatuses 10. Excepting for this point, configurations of the right and left reclining apparatuses 10 are similar.

As illustrated in FIG. 4, a recessed portion 16 is formed at the lower arm 1. The recessed portion 16 has a circular shape coaxial with the recessed portion 11. The recessed portion 16 is formed to be deeper than the recessed portion 11 by another half die cutting. A groove (not illustrated), which extends outward in a diametrical direction, is formed at an inner circumferential surface of the recessed portion 16. On the other hand, as illustrated in FIG. 3, a groove 46 is provided at a boss portion 45 of the cam 40. A spring 86, which has a spiral shape, is attached so that one end thereof is attached to the groove of the recessed portion 16, and the other end thereof is attached to the groove 46, and a center of the spring 86 approximately corresponds to the rotational axis line C. Then, the spring 86 exerts operational force so that the cam 40 rotates counterclockwise in FIG. 5. Then, actions of the protruding pin 47 formed at the cam 40 and the cam long holes 56 and 66 formed at the pawls 50 and 60 move the pawls 50 and 60 from the rotational axis line C toward a direction of an outer circumference. At the same time, the pawl-pressing portions 411 of the cam surface 41 press the back cam surfaces 55 and 65 of the pawls 50 and 60 toward a direction of an outer circumference. Therefore, the inner teeth 25a can firmly engage with the outer teeth 54 and 64.

Figure 9:
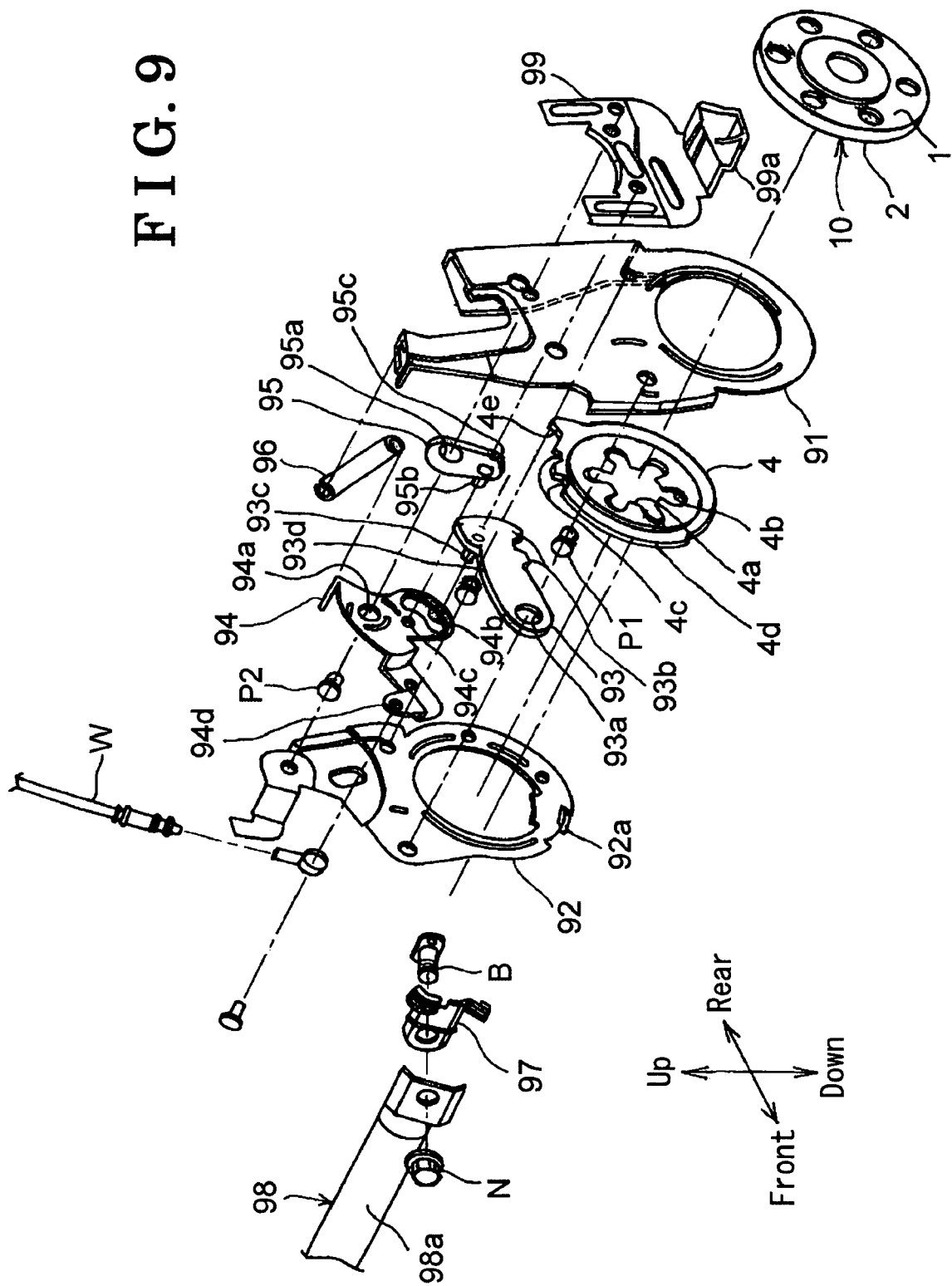
FIG. 9 represents an exploded perspective view mainly illustrating a part including a ratchet 4 in the reclining apparatus 10.

FIG. 9 represents an exploded perspective view illustrating an assembling structure of the ratchet 4. As illustrated in FIGS. 9 and 4, the ratchet 4 has a disk shape with the penetrating hole 4a. The ratchet 4 is located between two upper plates 91 and 92 with the lower arm 1 and the upper arm 2. The upper plates 91 and 92 configure a part of the seat back frame 1d. The upper plates 91 and 92 are connected to a body frame (not illustrated), which configures the seat back frame 1d. Further, a protruding portion 29, which is formed at the upper arm 2, engages with a recessed portion 4b, which is formed at an inner circumferential surface of the penetrating hole 4a of the ratchet 4. The ratchet 4 is fixed to the upper arm 2 by welding.

Further, a pawl 93, which serves as an engaging member, a lever 94, and a cam 95 are located between the two upper plates 91 and 92. A pin P1, which is fixed to the both upper plates 91 and 92, is inserted into a penetrating hole 93a of the pawl 93. The pawl 93 is rotatably supported by the pin P1. Then, a protruding portion 93b, which is formed at the pawl 93, engages with a recessed portion 4c, which serves as engaging portion formed at an outer circumferential surface of the ratchet 4.

A pin P2, which is fixed to both upper plates 91 and 92, is inserted into a penetrating hole 94a of the lever 94 and a penetrating hole 95a of the cam 95. The lever 94 and the cam 95 are rotatably supported by the pin P2. Then, a pin 95b, which is formed at the cam 95 by embossing, is fitted into a hole 94c of the lever 94. Accordingly, the cam 95 is not rotatable relative to the lever 94. Therefore, the cam 95 rotates with the lever 94 as a unit.

Further, a pin 93c, which is formed at the pawl 93 by embossing, is slidably inserted into a long hole 94b, which is formed at the lever 94 and which has a shape of cloud. The pawl 93 rotates in accordance with rotation of the lever 94 by virtue of the long hole 94b and the pin 93c. Further, a biasing force of a spring 96, of which one end is attached to the lever 94 and of which the other end is attached to the upper plate 91, operates the lever 94 counterclockwise in FIG. 9. Further, a wire W, which moves in cooperation with an operation handle (not illustrated) for walk-in operation, is connected to an end portion 94d of the lever 94.

A bracket 97 is attached to a surface of the ratchet 4, the surface opposite to the upper arm 2, by welding. One end of a rod 98, which serves as a connecting member and which extends in a right and left direction of the vehicle 200, is fastened by a bolt B and a nut N to the bracket 97. The other end of the rod 98 is connected to the bracket 97 of the reclining apparatus 10 of opposite side. By this, the ratchet 4 and the upper arm 2 of the right side reclining apparatus 10 and the ratchet 4 and the upper arm 2 of the left side reclining apparatus 10 rotate synchronously.

Further, a protruding portion 4e, which protrudes outward, is formed at a part of the outer circumferential surface of the ratchet 4, the part opposite of an arc surface 4d relative to the recessed portion 4c. A stopper 92a, which extends toward the upper plate 91, is formed at the upper plate 92. Then, in a situation where the ratchet 4 rotates counterclockwise in FIG. 9, the protruding portion 4e comes in contact with the stopper 92a to restrict rotation of the ratchet 4.

It is preferable for the rod 98 to be made of metal and to be formed to have a cross-section of an arc shape of a half circle. Further, the rod 98 is located so that an outer arc surface 98a of the rod 98 faces a back of a seating occupant in a state where the seat back 1b stands (illustrated in FIG. 2). By this, in a situation where the back of the seating occupant is strongly pushed to the seat back 1b at the time of collision of the vehicle 200, the rod 98 can support the seating occupant more safely. Further, in a situation where a load is applied to the rod 98 from the seating occupant at the time of collision of the vehicle 200, the rod 98 can absorb shock of the collision by preferable plastic deformation of the rod 98. Accordingly, reaction force to the seating occupant, the reaction force which is caused by that the back of the seating occupant is pushed to a strength member (not illustrated), which connects right and left upper frames 1d, can be reduced.

Further, according to the arrangement of the rod 98 described above, in a situation of a full-flat mode, in which the seat back 1b is fully reclined forward and a back surface of the seat back 1b is in a flat state, the rod 98 is positioned at an end portion of the seat back 1b. Accordingly, a load applied to the back surface of the seat back 1b in the full-flat mode can be preferably supported by the rod 98, for example, in a situation where a hand of an occupant pushes on the back surface of the seat back 1b.

Next, reclining operation, forward reclining operation, and walk-in operation of the reclining apparatus 10 in the seat 100 for the vehicle 200, which is configured as described above, will be explained. In the meantime, the reclining operation means an operation performed in a situation where a rotational position of the seat back 1b is adjusted within a range of seating positions. The forward reclining operation and the walk-in operation mean operations performed in a situation where the rotational position of the seat back 1b is made to a forward reclining position, which is positioned forward of the range of the seating positions, in order to make entrance/exit of the occupant to/from a seat 300, which is positioned backward of the seat back 1b, easy. The forward reclining operation is an operation performed in a situation where mainly the seating occupant operates the operation handle 85, the walk-in operation is an operation performed in a situation where mainly an occupant of the rear seat 300 or an operator outside the vehicle 200 operates an operation lever (not illustrated), which is located at an upper portion of the seat back 1b.

(Reclining Operation)

FIG. 5 represents a diagram illustrating a locked state of the reclining apparatus 10. In the locked state, the pawl-pressing portions 411 of the cam 40 contact the back cam surfaces 55 and 65 of the pawls 50 and 60. The pawls 50 and 60 are pressed by the pawl-pressing portions 411. Thus, the outer teeth 54 and 64 of the pawls 50 and 60 engage with the teeth portion 25a of the upper arm. Then, rotation of the upper arm 2 relative to the lower arm 1 is restricted. In this situation, because the cam 40 is movable in the recessed portion 25 in a direction of the pawl-pressing portion 411 relative to the hinge axis 70, the cam 40 can press three pawls by approximately uniform pressure. Accordingly, firm lock without a clattering feeling can be achieved.

In a situation where the operation handle 85 is operated in this state, the hinge axis 70 rotates clockwise in FIG. 5 with the cam 40 as a unit against the biasing force of the spring 86.

Then, the pawl-pressing portions 411 of the cam surface 41 become out of contact from the back cam surfaces 55 and 65 of the pawls, and the pawls 50 and 60 are pulled toward the rotational axis line C side along the guiding wall 121 by action of the cam long holes 56 and 66 of the pawls and the protruding pin 47 of the cam 40. Then, engagement of the outer teeth 54 and 64 of the pawls 50 and 60 with the inner teeth 25a is released. Accordingly, the seat back 1b, which is supported by the seat back frame 1d, can rotate to an arbitrary position relatively to the seat cushion 1a, which is supported by the cushion frame 1c. At this time, because the ratchet 4 engages with the protruding portion 93b of the pawl 93, the ratchet 4 rotates with the upper plates 91 and 92, which configure a part of the seat back frame 1d, and the upper arm 2 as a unit.

Here, because three aligning portions 412 of the cam 40 engage with the three cam-engaging portions 122 approximately at the same time, the cam 40 is aligned by the cam-engaging portions 122. Accordingly, an approximately uniform clearance is made between the outer teeth 54 and 64 of the pawls 50 and 60 and the inner teeth 25a. Therefore, rotation defect or operation's feeling defect, caused by partial engagement of the pawls with the arm, can be removed.

(Forward Reclining Operation)

Figure 6:
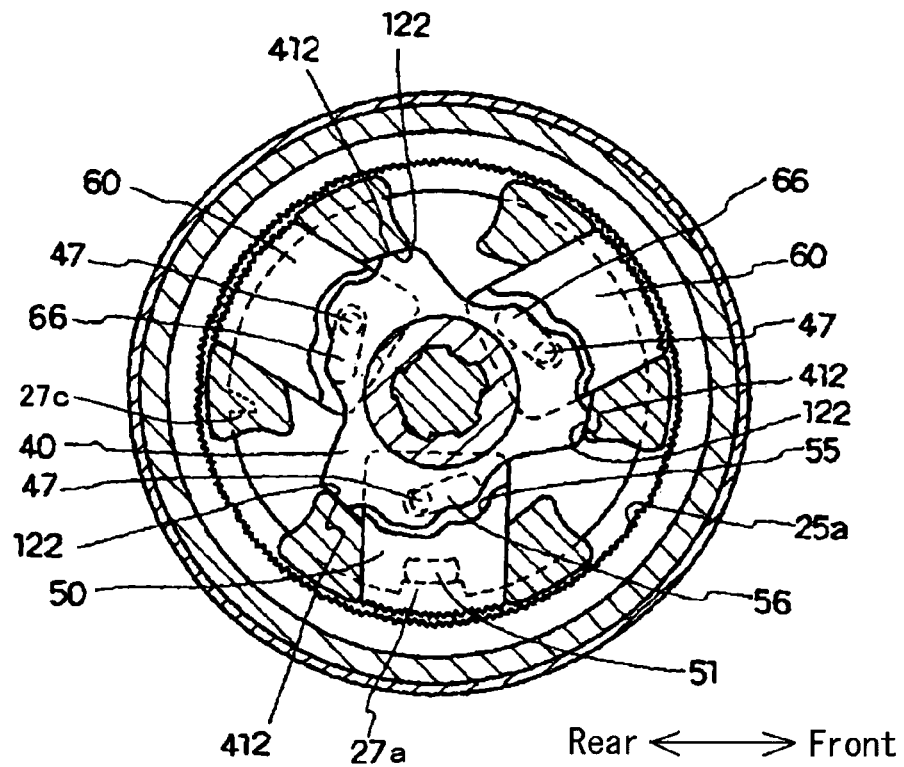
FIG. 6 represents a cross-sectional view taken on line VI-VI of FIG. 4, the cross-sectional view illustrating a lock-released state of the pawls 50 and 60.

In a state where a lock is released as described above, the seat back 1b is rotated relatively to the seat cushion 1a to a predetermined angle or a forward direction of a predetermined angle, in other words, to a forward reclining angle range. At this time, the projection 27a, which is formed at the inner circumferential surface of the recessed portion 26 of the upper arm 2, rotates clockwise in FIG. 5, and enters between the projection 51, which is formed at the side surface of the pawl 50, and the inner teeth 25a, as illustrated in FIG. 6. In a situation where the operation handle 85 is released in this state, the cam 40 presses the pawl 50 in a direction of engagement with the inner teeth 25a by operational force of the spring 84. However, movement of the pawl 50 is inhibited, and engagement is not made. At this time, other two pawls 60 are restricted at positions, where engagement with the inner teeth is not made, by operation of the cam long holes 66 and the protruding pins 47.

Accordingly, within the forward reclining angle range, the seat back 1b can rotate without being locked, and the seat back 1b can rotate to a large extent at once by operational force of the spring 1g attached so that the seat back 1b reclines forward relatively to the seat cushion 1a. Thus, entrance or exit to or from the rear seat 300 can be made easy. At this time, because the ratchet 4 engages with the protruding portion 93b of the pawl 93, the ratchet 4 rotates with the upper plates 91 and 92, which configure a part of the seat back frame 1d, and the upper arm 2 as a unit.

In a situation where the operation handle 85 is operated to return the seat back 1b backward from the forward-reclined state so that the seat back 1b becomes again an optimum position for the occupant to seat, and the operation handle 85 is released at this position, the pawls 50 and 60, and the cam 40 return to a state illustrated in FIG. 5, and the seat back 1b is firmly locked.

As illustrated in FIG. 5, in the seat reclining apparatus 10 according to the embodiment of the present invention, the three pawls 50 and 60 are located in the inner teeth 25a. However, a part of the inner teeth 25a, which engages with each of pawls 50 and 60, is not separately defined. In other words, even in a situation where the projection 27a rotates counterclockwise in FIG. 5 and comes to a position of the pawl 60, because, not like the pawl 50, the pawl 60 does not include the projection 51, which contacts with the projection 27a and inhibits engagement of the pawl 60, all of the pawls 50 and 60 can engage with the inner teeth 25a. As described above, in a situation where the seat back is reclined backward, each of the pawls engage with a portion of the inner teeth, which were engaged with another pawl when the seat back was adjusted forward. In other words, the pawls have common engaging angle region of the inner teeth. In this configuration, an adjusting angle region is not limited by the number of pawls. Accordingly, a backward operating angle region can be set large.

In the meantime, in a situation where the seat back 1b is rotated relatively to the seat cushion 1a to backward of the range of the seating positions, the projection 27c, which is formed at the inner circumferential surface of the recessed portion 26 of the upper arm 2, and which serves as a stopping means (second stopper), rotates counterclockwise in FIG. 5, and contacts with the projection 51, which is formed at a side surface of the pawl 50, and which serves as a stopping means (first stopper). Thus, further counterclockwise rotation of the projection 27c is restricted.

(Walk-in Operation)

Next, operation performed in a situation where the seat back is operated to recline forward (walk-in operation), at the time of entrance or exit to or from the seat 100, which is positioned backward of the seat back 1b, in a state where the position of the reclining angle adjustment is memorized, will be explained. In a situation where an occupant of the rear seat 300 or an operator outside the vehicle 200 operates an operation lever (not illustrated), which is located at an upper portion of the seat back 1b, at the time of the locked state in FIG. 5, for performing the walk-in operation, the wire W illustrated in FIG. 9 is pulled upward and the lever 94 rotates clockwise in FIG. 9 against biasing force of the spring 96.

Then, the pin 93c of the pawl 93 is pulled upward by the end surface of the long hole 94b of the lever 94, and the pawl 93 rotates counterclockwise. Then, the protruding portion 93b of the pawl 93, the protruding portion 93b, which has engaged with the recessed portion 4c of the ratchet 4, departs from the recessed portion 4c. Accordingly, the upper plates 91 and 92, which configure a part of the seat back frame 1d, become rotatable relative to the ratchet 4. Then, similarly to the forward reclining operation, the seat back 1b can be rotated without being locked, and the seat back 1b rotates forward relatively to the seat cushion 1a to a large extent at once by operational force of the spring 1g within the forward reclining angle range. Thus, entrance or exit to or from the rear seat 300 can be made easy.

At this time, because the three pawls 50 and 60 are in the locked state, the lower arm 1, the upper arm 2, and the ratchet 4 cannot rotate relative to the lower frame 1c. The seat back 1b rotates forward in a state where the rotational angle of the upper arm 2 relative to the lower arm 1, in other words, the position of reclining angle adjustment, is memorized. Further, a stopper 99 (refer to FIGS. 2 and 9) is fixed to a side surface of the upper plate 91. A contact portion 99a of the stopper 99 contacts with a contact portion 1h provided at the lower frame 1c to restrict forward rotation of the seat back 1b.

In the meantime, in a situation where the engagement of the pawl 93 with the ratchet 4 is released after the seat back 1b starts to rotate forward once, the protruding portion 93b of the pawl 93 merely slides along the arc surface 4d of the ratchet 4 even in a situation where an operator releases the operation lever at the upper portion of the seat back 1b. Accordingly, the seat back 1b can rotate forward.

In a situation where the seat back 1b is raised backward from the forward reclined state as described above, the pawl 93 moves backward with the rotation of the upper plates 91 and 92. The protruding portion 93b of the pawl 93 slides along the arc surface 4d of the ratchet 4 concomitantly with the movement of the pawl 93. At this time, the cam 95 is biased counterclockwise in FIG. 9 by biasing force of the spring 96 with the lever 94, and a lower end portion 95c of the cam 95 presses an upper end portion 93d of the pawl 93. By this, the pawl 93 is biased clockwise in FIG. 9. Accordingly, because the protruding portion 93b of the pawl 93 is pressed to the arc surface 4d, in a situation where the sliding protruding portion 93b reaches a position of the recessed portion 4c, the protruding portion 93b fits to and engages with the recessed portion 4c.

Here, in a situation where an erroneous operation is performed, for example, in a situation where the operation handle 85 is wrongly operated at the time of the walk-in operation, and the lock of the pawls 50 and 60 are thereby released, the upper arm 2 becomes rotatable with the ratchet 4 freely out of relation to the rotational position of the seat back 1b. In such a situation, according to the embodiment, because the right and left ratchets 4 are connected through the rod 98, deviation in the phases of the rotational angles of the upper arms 2, relative to the lower arms 1 of the reclining apparatus 10 of the right side of the seat 100 and the reclining apparatus 10 of the left side of the seat 100, can be prevented.

Accordingly, recline of a structure, which has a shape of a gate, which is configured by the right and left upper arms 2 and a rod which connects the arms 2, in a state where the structure is twisted in a situation where the seat back 1b is operated to recline with deviated phases, can be prevented. Thus, degradation of the operation's feeling can be inhibited. Or else, defect of an engagement of one ratchet 4, which tends to occur when the seat back 1b is raised to a seating state with the deviated phases, can be prevented.

Further, in a situation where the seat back 1c is raised backward of the vehicle 200 in a state where the erroneous operation described above is performed, the projection 27c of the upper arm 2 contacts the projection 51 of the pawl 50 so that counterclockwise rotation of the upper arm 2 is restricted. By this, rotation of the upper frame 1d, by which the protruding portion 93b of the pawl 93 gets across a position of engagement (a predetermined rotational position) with the recessed portion 4c of the ratchet 4, can be prevented by contact of the projection 27c with the projection 51. Accordingly, impossibility of recovery, to a state where the protruding portion of the pawl 93 can engage with the recessed portion 4c of the ratchet 4, can be prevented.

Further, according to the embodiment, because the both projections 27c and 51, which configure the stopping means, can be installed in the both arms 1 and 2, comparing with a situation where a stopping means is provided outside the both arms 1 and 2, miniaturization can be planned.

OTHER EMBODIMENTS

In the embodiment described above, the right and left ratchets are connected through the rod 98. However, in other embodiment of the present invention, the right and left upper arms 2 can be connected through the rod 98. Or else, an upper arm 2 of one of the right and left reclining apparatuses 10 and a ratchet 4 of the other of the right and left reclining apparatuses 10 can be connected through the rod 98.

Further, in the embodiment described above, the ratchet 4 is interposed between the upper arm 2 and the seat back frame 1d. However, in other embodiment of the present invention, the ratchet 4 can be interposed between the lower arm 1 and the cushion frame 1c. In this situation, in addition to a configuration in which the right and left ratchets 4 are connected through the rod 98, a configuration in which the right and left lower arms 1 are connected through the rod 98, and a configuration in which a lower arm 1 of one of the right and left reclining apparatuses 10 and a ratchet 4 of the other of the right and left reclining apparatuses 10 are connected through the rod 98, can serve as examples.

Further, in the embodiment described above, the stopping means, which is configured by the both projections 27c and 51, is installed in the both arms 1 and 2. However, in other embodiment of the present invention, the stopping means can be provided outside the both arms 1 and 2, which are different from the upper arm 2 and the pawl 50.

Further, the reclining apparatus 10 according to the embodiment included three pawls 50 and 60. However, in another embodiment of the present invention, the reclining apparatus 10 can include five pawls so that improvement of the locking strength can be planned.

According to a first aspect of the present invention, a seat for a vehicle includes a cushion frame provided at each of left side and a right side of a seat cushion for supporting the seat cushion, a seat back frame provided at each of a left side and a right side of a seat back for supporting the seat back, the seat back frame rotatable to the cushion frame, a right side reclining apparatus provided between the cushion frame of the right side of the seat cushion and the seat back frame of the right side of the seat back for adjusting a rotational position of the seat back frame, and a left side reclining apparatus provided between the cushion frame of the left side of the seat cushion and the seat back frame of the left side of the seat back for adjusting the rotational position of the seat back frame. Each of the right side reclining apparatus and the left side reclining apparatus includes an upper arm rotatable with the seat back frame, a lower arm to which the upper arm is rotatably attached, and a lock member for switching between a locked state, in which rotation of the upper arm relative to the lower arm is locked, and a lock-released state, in which a lock of the rotation of the upper arm relative to the lower arm is released, in a situation where the rotational position of the seat back frame is to be adjusted within a range of seating positions. At least one of the right side reclining apparatus and the left side reclining apparatus includes a rotating member for forward-tilting attached to either one of the upper arm and the lower arm so that the rotating member for forward-tilting cannot rotate relative to either one of the upper arm and the lower arm, the rotating member for forward-tilting enabling the seat back frame to rotate relative to the cushion frame while the locked state is retained, and an engaging member which engages with/disengages from an engaging portion formed at the rotating member for forward-tilting for locking rotation of the rotating member for forward-tilting by engaging with the engaging portion. The seat for the vehicle further includes a connecting member for connecting the right side reclining apparatus and the left side reclining apparatus so that a rotational angle of the upper arm relative to the lower arm of the right side reclining apparatus is synchronized with a rotational angle of the upper arm relative to the lower arm of the left side reclining apparatus.

According to a second aspect of the present invention, the rotating member for forward-tilting and the engaging member are provided at each of the right side reclining apparatus and the left side reclining apparatus, and the connecting member connects the rotating member for forward-tilting of the right side reclining apparatus and the rotating member for forward-tilting of the left side reclining apparatus.

According to a third aspect of the present invention, the lower arm is fixed to the cushion frame so that the lower arm cannot rotate relative to the cushion frame, and the upper arm is fixed to the rotating member for forward-tilting.

According to a fourth aspect of the present invention, the vehicle for the seat further includes a stopping means for restricting rotation of the rotating member for forward-tilting relative to the lower arm in a direction that the seat back is raised backward of the vehicle at a predetermined rotational position in a state where the engaging member is disengaged from the engaging portion and in the lock-released state, and the predetermined rotational position is set to a position where the engaging portion engages with the engaging member.

According to a fifth aspect of the present invention, the lock member is located in either one of the lower arm and the upper arm in a state where movement of the lock member in a rotational direction is restricted, the stopping means includes a first stopper formed at the lock member and a second stopper formed at the other of the lower arm and the upper arm, and the first stopper and the second stopper make contact at the position where the engaging portion engages with the engaging member.

According to the aspects of the present invention, reclining operation for adjusting the rotational position of the seat back frame within the range of the seating positions can be performed by turning the lock member into the lock-released state while the rotating member for forward-tilting is locked by the engaging member. Further, a walk-in operation, in which the seat back is reclined forward while the position of the reclining angle adjustment is memorized, can be performed by disengaging the engaging member from the engaging portion of the rotating member for forward-tilting while the locked state is retained.

Then, at the time of the walk-in operation, even in a situation where an erroneous operation is performed, for example, in a situation where the lock member is turned into the lock-released state, rotational angles of the right and left upper arms are synchronized by the connecting member for connecting the right and left reclining apparatuses. Accordingly, phase shift between the right side reclining apparatus and the left side reclining apparatus can be prevented, and degradation of feeling of an operation can be inhibited in a situation where the seat back is operated to be reclined. Further, according to the second aspect of the present invention, because the rotating member for forward-tilting is provided at each of the right and left reclining apparatuses, rotational force of the seat back applied to the rotating member for forward-tilting from the engaging member can be dispersed to the right and left rotating members for forward-tilting. Accordingly, strength required for the rotating member for forward-tilting can be reduced, and miniaturization of the rotating member for forward-tilting can be planned. Further, because a space for a connecting portion with the connecting member can be more easily ensured for the rotating member for forward-tilting than for the both arms, according to the second aspect of the present invention, it is preferable to connect both rotating members for forward-tilting by the connecting member.

Further, according to the fourth aspect of the present invention, in a situation where the seat back is raised backward of the vehicle in a state where the engaging member is disengaged from the engaging portion, and in the lock-released state, in other words, in a state where the erroneous operation described above is performed, rotation of the upper frame, which gets across a position where the engaging portion engages with the engaging member, can be inhibited by the stopping means. Accordingly, impossibility of recovery to a state where the engaging member can engage with the engaging portion can be prevented.

Further, according to the fifth aspect of the present invention, because the stopping means can be installed in the both arms, miniaturization can be planned in comparison with a situation where the stopping means is installed outside the both arms.

The principles, preferred embodiment and mode of operation of the present invention, have been described in the foregoing specification. However, the invention that is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A seat for a vehicle, comprising:
    a cushion frame provided at each of a left side and a right side of a seat cushion for supporting the seat cushion;
    a seat back frame provided at each of a left side and a right side of a seat back for supporting the seat back, the seat back frame rotatable to the cushion frame;
    a right side reclining apparatus provided between the cushion frame of the right side of the seat cushion and the seat back frame of the right side of the seat back for adjusting a rotational position of the seat back frame;
    a left side reclining apparatus provided between the cushion frame of the left side of the seat cushion and the seat back frame of the left side of the seat back for adjusting the rotational position of the seat back frame;
    each of the right side reclining apparatus and the left side reclining apparatus including:
    an upper arm rotatable with the seat back frame;
    a lower arm to which the upper arm is rotatably attached;
    a lock member, the lock member of right side reclining apparatus operating in association with the lock member of the left side reclining apparatus so as to switch between a locked state, in which rotation of the upper arm relative to the lower arm is locked, and a lock-released state, in which a lock of the rotation of the upper arm relative to the lower arm is released, in a situation where the rotational position of the seat back frame is to be adjusted within a range of seating positions;
    a rotating member for forward-tilting attached to either one of the upper arm and the lower arm so that the rotating member for forward-tilting cannot rotate relative to either one of the upper arm and the lower arm, the rotating member for forward-tilting enabling the seat back frame to rotate relative to the cushion frame while the locked state is retained; and
    an engaging member which engages with/disengages from an engaging portion formed at the rotating member for forward-tilting for locking rotation of the rotating member for forward-tilting by engaging with the engaging portion; and
    a connecting member connecting the rotating member for forward-tilting of the right side reclining apparatus to the rotating member for forward-tilting of the left side reclining apparatus.

2. The seat for the vehicle according to claim 1, wherein the lower arm is fixed to the cushion frame so that the lower arm cannot rotate relative to the cushion frame, and the upper arm is fixed to the rotating member for forward-tilting.

3. The seat for the vehicle according to claim 2, further comprising a stopping means for restricting the rotation of the rotating member for forward-tilting relative to the lower arm in a direction that the seat back is raised backward of the vehicle at a predetermined rotational position in a state where the engaging member is disengaged from the engaging portion and in the lock-released state, wherein
    the predetermined rotational position is set to a position where the engaging portion engages with the engaging member.

4. The seat for the vehicle according to claim 3, wherein the lock member is located in either one of the lower arm and the upper arm in a state where movement of the lock member in a rotational direction is restricted, the stopping means includes a first stopper formed at the lock member and a second stopper formed at the other of the lower arm and the upper arm, and the first stopper and the second stopper make contact at the position where the engaging portion engages with the engaging member.

5. The seat for the vehicle according to claim 1, wherein the connecting member is an elongated rod.

6. The seat for the vehicle according to claim 5, wherein the lower arm is fixed to the cushion frame so that the lower arm cannot rotate relative to the cushion frame, and the upper arm is fixed to the rotating member for forward-tilting.

7. The seat for the vehicle according to claim 6, further comprising a stopping means for restricting the rotation of the rotating member for forward-tilting relative to the lower arm in a direction that the seat back is raised backward of the vehicle at a predetermined rotational position in a state where the engaging member is disengaged from the engaging portion and in the lock-released state, wherein
    the predetermined rotational position is set to a position where the engaging portion engages with the engaging member.

8. The seat for the vehicle according to claim 7, wherein the lock member is located in either one of the lower arm and the upper arm in a state where movement of the lock member in a rotational direction is restricted, the stopping means includes a first stopper formed at the lock member and a second stopper formed at the other of the lower arm and the upper arm, and the first stopper and the second stopper make contact at the position where the engaging portion engages with the engaging member.

9. The seat for the vehicle according to claim 5, further comprising a stopping means for restricting the rotation of the rotating member for forward-tilting relative to the lower arm in a direction that the seat back is raised backward of the vehicle at a predetermined rotational position in a state where the engaging member is disengaged from the engaging portion and in the lock-released state, wherein
    the predetermined rotational position is set to a position where the engaging portion engages with the engaging member.

10. The seat for the vehicle according to claim 9, wherein the lock member is located in either one of the lower arm and the upper arm in a state where movement of the lock member in a rotational direction is restricted, the stopping means includes a first stopper formed at the lock member and a second stopper formed at the other of the lower arm and the upper arm, and the first stopper and the second stopper make contact at the position where the engaging portion engages with the engaging member.

11. The seat for the vehicle according to claim 1, further comprising a stopping means for restricting the rotation of the rotating member for forward-tilting relative to the lower arm in a direction that the seat back is raised backward of the vehicle at a predetermined rotational position in a state where the engaging member is disengaged from the engaging portion and in the lock-released state, wherein the predetermined rotational position is set to a position where the engaging portion engages with the engaging member.

12. The seat for the vehicle according to claim 11, wherein the lock member is located in either one of the lower arm and the upper arm in a state where movement of the lock member in a rotational direction is restricted, the stopping means includes a first stopper formed at the lock member and a second stopper formed at the other of the lower arm and the upper arm, and the first stopper and the second stopper make contact at the position where the engaging portion engages with the engaging member.

13. The seat for the vehicle according to claim 1, wherein the connecting member includes a rod extending in a right and left direction of the vehicle.

14. The seat for the vehicle according to claim 1, wherein the lock member of the right side reclining apparatus and the lock member of the left side reclining apparatus are connected by a hinge axis, and the connecting member includes a rod different from the hinge axis and extending in a right and left direction of the vehicle.

15. The seat for the vehicle according to claim 1, wherein the rotating member for forward-tilting rotates relative to the lock member.

* * * * *